June 24, 1958 B. WALKER 2,840,390

SWAY STABILIZER AND OVERLOAD SPRING FOR VEHICLE

Filed March 31, 1953

INVENTOR

Brooks Walker

United States Patent Office 2,840,390

Patented June 24, 1958

2,840,390

SWAY STABILIZER AND OVERLOAD SPRING FOR VEHICLE

Brooks Walker, Piedmont, Calif.

Application March 31, 1953, Serial No. 345,803

2 Claims. (Cl. 280—124)

This invention pertains to vehicle springing that combines a sway stabilizer and overload in the same mechanism.

Manually operated overload springs have been shown in my U. S. Patent No. 2,518,733. Sway stabilizer springs offer no resistance to both wheels to which they are attached if they move together, but resist the roll of the car when cornering or driving on a highly crowned road.

This invention covers an additional function of sway stabilizer springs to provide that, by manual control of the driver of the vehicle, such sway stabilizer springs can be made to act as overload springs while still acting as sway stabilizer springs. When the vehicle is traveling with a light load the sway stabilizer springs act as stabilizers only, but when an additional load is added to the vehicle and the driver wishes to maintain the same vehicle wheel spring action, before hitting the frame, bumpers, or stops, the operator by this invention can manually, or with vehicle power, add load carrying capacity to said overload springs with sway stabilizer springs already attached between the spring and unsprung rear vehicle wheels.

On some vehicles this invention provides considerable economy by using the same parts for an overload spring, that can be operated to afford varying degrees of overload carrying capacity at the selection of the vehicle operator, or the operator can render said overload springs inoperative as such and operative only as sway stabilizer.

As a means of controlling the overload springs, I have shown manual powered means similar to a hand brake control or power means such as a vacuum operated or fluid operated such as by engine oil pressure, hydraulic pressure, or air pressure.

Other features will be more particularly pointed out in the accompanying specifications and claims.

I have shown my invention by way of illustration in the accompanying drawings, in which.

On all figures like numerals of reference refer to corresponding parts in the various views.

Figures 1, 2, 3, 4, 5:
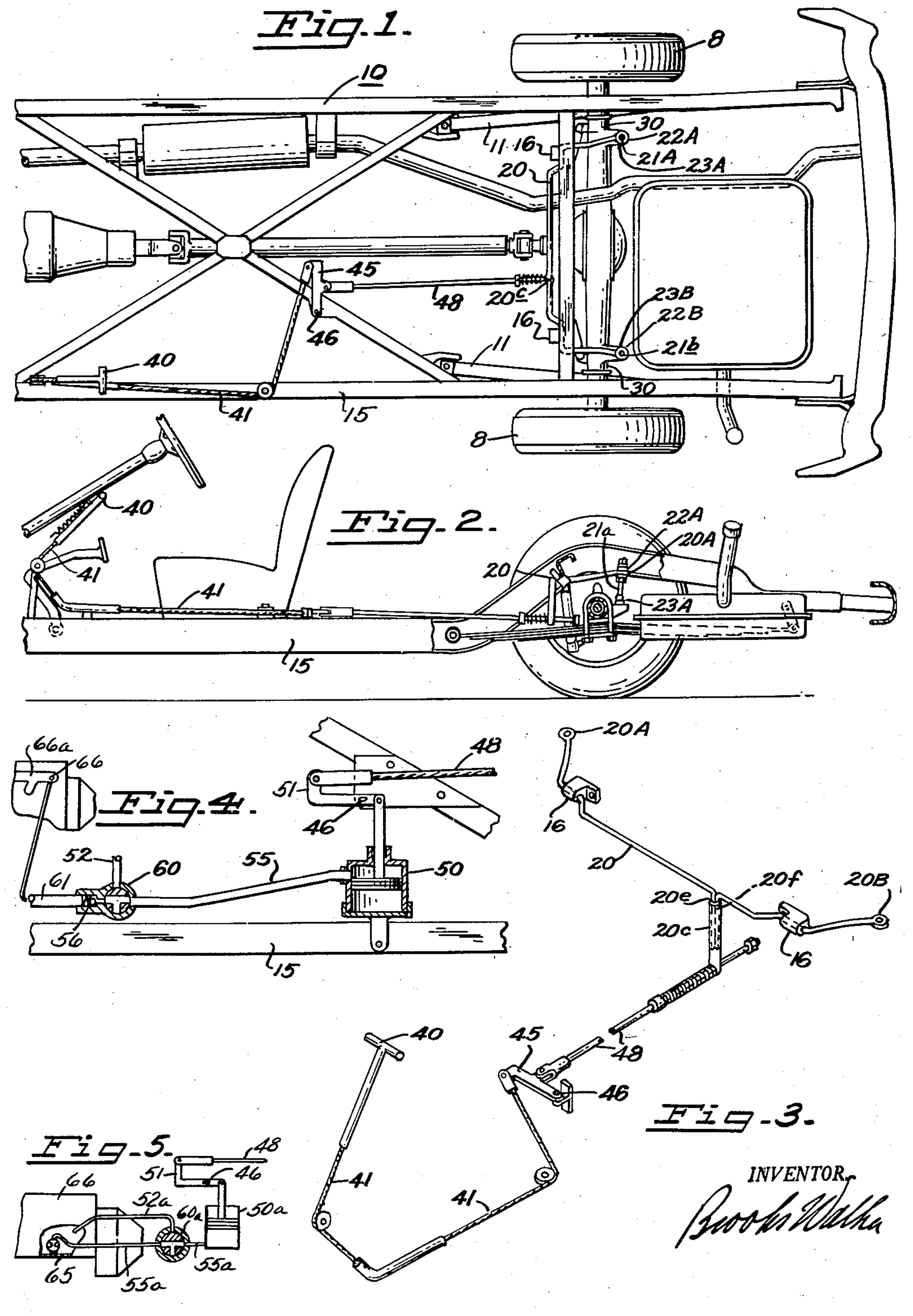
Fig. 1 shows a plan view of a vehicle chassis employing one form of the invention.
Fig. 2 shows an elevation view of the construction shown in Fig. 1.
Fig. 3 shows an enlarged plan view of another form of operating the invention.
Fig. 4 shows a modified view of another manner of operating the invention, utilizing a power source.
Fig. 5 shows a schematic fluid circuit for operating the structure of the present invention.

In Figs. 1, 2, and 3 I have shown a vehicle chassis 10 with rear wheels 8, rear resilient springs 11 for supporting the rider on the vehicle frame 15 on rear wheels 8. Sway stabilizer spring 20 is mounted on the vehicle frame 15 by resilient bearings 16. The ends 20A and 20B are connected to the rear wheel supporting structure 30 by links **21*a* and 21*b* respectively. The ends of said links are connected to stabilizer ends 20A and 20B by rubber-like joints 22A and 22B respectively. The lower ends of links 21A and 21B are similarly joined by resilient joints 23A and 23B, to rear wheel supporting structure 30**.

Stabilizer spring 20 may be composed of two parts joined by adapter **20*c* which joins arms 20*e* and 20*f* which extend at right angles to the portion of stabilizer spring 20 that extends between resilient bearings 16**.

Hand overload control lever 40 is located in the driver's compartment and is similar to a hand brake. Control cable 41 connects overload control lever 40 to link 45. Lever 45 is pivoted to the vehicle frame at 46. Cable 48 connects lever 45 to the lower end of adapter **20*c*. Lever 45 provides a mechanical advantage between the pull on cable 41 and cable 48 by which the operator can selectively render the overload action of stabilizer spring inactive or can provide any degree of vehicle overload support between the vehicle rear wheels 8 and the vehicle frame 15** that the vehicle operator desires.

As an alternate, I have shown in Fig. 4 a cylinder 50 for operating lever 51 to control cable 48 to provide power means of controlling the overload action of sway stabilizer 20. A valve 60 controls the power fluid. A fluid such as engine vacuum procured from the intake manifold **66*a* of an engine 66, is used through a line 61 to supply the power for cylinder 50. In one position of valve 60 the vacuum is connected to cylinder 50 through a check valve 56 and prevents loss of vacuum in cylinder 50 when the throttle is opened. When valve 60 is in the other position, the engine vacuum is shut off at the valve and atmosphere is admitted to cylinder 50 through lines 52 and 55**.

In Fig. 5 I have shown a construction wherein the engine supplied oil pressure is used, such as lubricating oil pressure from a pump 65 driven by the engine 66. The outlet **52*a* is connected to the crank case or reservoir so that in the one position of the valve 60*a* oil pressure is supplied to cylinder 50*a* and in the other cylinder 50*a* is connected to the crank case or oil reservoir. Where pressure instead of vacuum is used line 55*a* running from valve 60*a* to cylinder 50*a* will be connected to the lower end of cylinder 50*a***.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In a motor vehicle having a supporting structure, wheel supporting means at one end of the structure, resilient means connecting said wheel supporting means to said structure, a stabilizing bar having a central portion and arms extending laterally from the ends thereof, means pivotally supporting said central portion transversely across said structure, means pivotally connecting the ends of the arms to said wheel supporting means, an operating arm extending laterally from said central portion, means movably mounted on said structure and engaging said operating arm, and manually operable actuating means remote from said operating arm to actuate said engaging means to move said operating arm angularly and twist said central portion of said stabilizing bar independently of relative movement between said structure and wheel supporting means.

2. In a motor vehicle having a supporting structure, wheel supporting means at one end of the structure, resilient means connecting said wheel supporting means to said structure, a stabilizing bar having a central portion and arms extending laterally from the ends thereof, means pivotally supporting said central portion transversely across said structure, means pivotally connecting the ends of the arms to said wheel supporting means, an operating arm extending laterally from said central portion, means movably mounted on said structure and engaging said operating arm, means defining a driver's station on said vehicle, actuating means remote from said operating arm and readily accessible to a driver at said station to actuate, at any time, said engaging means to move said operating arm angularly and twist said central portion of said stabilizing bar independently of relative movement between said structure and wheel supporting means.

References Cited in the file of this patent

UNITED STATES PATENTS

| | | |
|---|---|---|
| 2,257,913 | Maranville | Oct. 7, 1941 |
| 2,409,501 | Krotz | Oct. 15, 1946 |
| 2,518,733 | Walker | Aug. 15, 1950 |
| 2,577,761 | Hickman | Dec. 11, 1951 |
| 2,733,934 | Muller | Feb. 7, 1956 |

FOREIGN PATENTS

| | | |
|---|---|---|
| 681,645 | Germany | Oct. 29, 1952 |